United States Patent [19]

Bonnanzio

[11] 3,928,654

[45] Dec. 23, 1975

[54] METHOD AND FORMULATION FOR PREVENTING SNOW AND ICE ACCUMULATION

[76] Inventor: Anthony J. Bonnanzio, Westport Road, Fairfield, Conn. 06430

[22] Filed: Apr. 19, 1974

[21] Appl. No.: 462,339

Related U.S. Application Data

[63] Continuation-in-part of Ser. No. 314,530, Dec. 13, 1972, abandoned, which is a continuation-in-part of Ser. No. 219,829, Jan. 21, 1972, abandoned, which is a continuation-in-part of Ser. No. 102,542, Dec. 29, 1970, abandoned.

[52] U.S. Cl. .................... 427/8; 106/13; 404/75; 252/70; 427/136; 427/421
[51] Int. Cl.² ................................................ C09K 3/18
[58] Field of Search ............ 252/70; 106/13; 427/8, 427/136, 421; 404/75

[56] References Cited
UNITED STATES PATENTS

| | | | |
|---|---|---|---|
| 1,213,368 | 1/1917 | Hibbert | 106/13 |
| 1,831,521 | 11/1931 | Wiseman | 106/13 |
| 2,258,184 | 10/1941 | Kenoy | 106/13 |
| 3,108,075 | 10/1963 | Hearst | 252/70 |
| 3,245,912 | 4/1966 | White | 252/70 |
| 3,696,042 | 10/1972 | Wright | 252/70 X |
| 3,756,956 | 9/1973 | Panusch | 252/70 |

*Primary Examiner*—Mayer Weinblatt
*Assistant Examiner*—John D. Smith
*Attorney, Agent, or Firm*—Alfred Musumeci

[57] ABSTRACT

Ice and snow accumulation on outdoor surfaces is prevented by application thereto of a formulation which consists essentially of 30 to 45 percent by volume of an alkylene glycol, preferably, ethylene or propylene glycol, in water, and about 0.1 percent by volume of an organic dyestuff containing ($-SO_3H$) sulfonic acid groups, to impart color thereto and to the treated surface. Diminution of the coloration by erosion of the formulation due to melting runoff will indicate the need to reapply the formulation.

5 Claims, No Drawings

METHOD AND FORMULATION FOR PREVENTING SNOW AND ICE ACCUMULATION

CROSS REFERENCE TO RELATED APPLICATIONS

This application is a continuation-in-part of co-pending application Ser. No. 314,530, now abandoned filed Dec. 13, 1972, which in turn is a continuation-in-part of application Ser. No. 219,829 now abandoned filed Jan. 21, 1972, which application was in turn a continuation-in-part of application Ser. No. 102,542 now abandoned, filed Dec. 29, 1970.

BACKGROUND OF THE INVENTION

1. Field of the Invention

The present invention relates to liquid deicer compounds, and more particularly to a preparation which may be applied to an outdoor surface to prevent the accumulation of ice and snow thereupon.

2. Prior Art

Accumulation of ice and snow on walkways, roads or other outdoor surfaces has generally required removal after the occurrence of an accumulation or build-up. Such removal usually involves the physical or mechanical transference of the ice or snow from the covered surface either by shoveling, plowing, or the like. Although some attempts have been made to provide means which prevent accumulation before it occurs, not much success has been realized with this type of approach.

The traditional approach to ice and snow removal continues to involve a laborious disposal process rather than successful prevention of accumulation. This is particularly true in the case of ordinary walkways, driveways and the like such as those normally found in populated areas adjacent houses or retail shops.

Although preparations comprising sodium chloride and calcium chloride which may be applied to a surface ostensibly to prevent accumulation have been available for some time, their use is limited and most homeowners or shopkeepers continue to approach the problem from the viewpoint of removal after accumulation rather than prevention of accumulation prior to its occurrence. The reason for this failure of presently known accumulation preventatives to gain discernable acceptance and success is considered to involve several factors relating to certain disadvantages inherent to one degree or another in all such prevention expedients.

In the case of sodium chloride preparations, commonly referred to as "rock salt" their application for ice or snow melting purposes involves serious disadvantages since they produce a chalky white residue which is usually tracked into houses, shops or other interior locations thereby causing objectionable soilage. Another significant factor in regard to such expedients is cost. Since the formulation which is to be used must be applied in large quantities to cover rather extensive surface areas, excessive cost will prevent commercial success and acceptability. Although rock salt involves the serious disadvantage of producing a messy residue, its cost is sufficiently low that it is found acceptable to a limited degree despite its drawbacks. However, other expedients which attempt to eliminate the problem of a messy residue arising in connection with the use of rock salt must be made available at relatively low cost in order to find commercial acceptability which would be a prerequisite of the achievement of their widespread acceptance and use. The inability of rock salt substitutes to provide effective prevention of snow accumulation at an acceptably low cost has been found to be the primary factor impeding such acceptability.

Accordingly, it will be clear that in order to provide an ice and snow accumulation preventative which can be considered generally successful, it must feature the combination of low cost without involving other unacceptable disadvantages such as the creation of a messy residue. It will be understood that an expedient which combines these features in a formulation which actually effectively prevents ice and snow accumulation will involve a significant forward step in the art.

A further consideration with regard to such accumulation preventatives relates to the fact that they must be periodically reapplied. In a snow fall of long duration, the effectiveness of an accumulation preventative will eventually become dissipated, and a second or subsequent reapplication will be required. With formulations presently known, it becomes difficult or impossible to discern when reapplication would be appropriate. Such a requirement does not usually become apparent until after a substantial amount of snow accumulation has occurred, and developed to a degree which makes reapplication less effective or totally useless. Accordingly, it would be advantageous to provide an approach whereby the necessity for a second or subsequent application of an accumulation preventative could be discerned at or shortly after dissipation of a first or prior application in a manner which avoids obstructive snow build-up prior to discernment of the need for reapplication of the preventative.

DETAILED DESCRIPTION

In accordance with the principles of the present invention, it has been discovered that a solution of 30 to 45 percent by volume of an alkylene glycol, preferably an alkylene glycol having from 2 to 6 carbon atoms, and most preferably ethylene or propylene glycol, and a small amount, usually on the order of about 0.1 percent of an organic dyestuff in water when applied to an exposed surface area, such as a walkway, driveway or the like, will function effectively to prevent accumulation of ice or snow thereupon without causing unsightly or messy residue. The formulation of the present invention is capable of being made commercially available at a relatively low price enhancing potential for commercial success, and general acceptability and use. The particular selection of ingredients and the range of the proportions within which they are provided in the formulation of the invention gives rise to the combination of beneficial features of the invention which include prevention of ice and snow accumulation at low cost and without creation of undesirable mess or soilage.

The use of a glycol as opposed to other polyhydric alcohols such as glycerol is an important element of the invention, because the substitution of glycerol for a glycol results in a composition having a different viscosity which affects the ease of application of the composition. Moreover, and perhaps more importantly, the use of glycerol leads to a composition having a lower degree of friction than is obtained with a glycol. Thus, an area covered with a glycerol based composition will tend to be made more slippery than an area covered with the present composition.

The presence of the dyestuff will enable discernment of the presence of the solution upon a surface. As snow or ice impinges the treated surface and melts and flows away, the effectiveness of the applied glycol formulation will become reduced by virtue of the fact that a portion of the formulation will be washed away by the melted runoff. Discernment of this occurrence will be enabled as a result of the coloration which is imparted to the formulation and to the surface to which it is applied by the presence of the dyestuff. The coloration imparted by the dyestuff will be discernible upon the treated surface, and as the coloration thereof fades due to runoff caused by the melting ice or snow, an indication of the necessity for a reapplication will be provided without necessitating allowance of a prohibitive degree of accumulation.

It has been found that the addition of as little as one-tenth of one percent by volume of an organic dyestuff will be sufficient to provide adequate indication that reapplication is necessary. Of course, more or less of the dyestuff can be added depending on the color level desired. It is thus only important that a sufficient amount of the dyestuff be added to impart a visible coloration to the formulation.

Dyestuffs suitable for use in the present invention are composed of organic dyestuffs which contain sulfonic acid (-SO$_3$H) groups. Dyestuffs which do not contain such groups leave severe residual stains on the treated surface. Consequently, it is difficult, if not impossible, to determine whether or not anti-freeze capability remains on the surface. That is to say, a substantial residual color remains with the non (-SO$_3$H) containing dyestuffs even when the anti-freeze resistance has completely disappeared.

Particularly suitable are those dyes falling in the following groups:

aromatic sulfonic acids, e.g., acid yellow 1, C.I. 10316, and bromaminic acid;

nitroso - sulfonic acids, e.g., acid green 1, C.I. 10020;

mono-azo sulfonic acids, e.g., acid orange 7, C.I. 15510, and acid blue 92, C.I. 13390;

diazo sulfonic acids, e.g., acid red 97, and C.I. 20890; and anthraquinine sulfonic acids; e.g., acid blue 78, C.I. 62105, acid blue 25, C.I. 62055, and acid green 25, C.I. 61550.

Other dyestuffs in these groups may be used, depending on the color desired, so long as they contain the sulfonic acid groups.

The discovery that an effective indication of the need for reapplication will be provided by the addition of as little as one-tenth of one percent by volume of such a dyestuff to a 30 to 45 percent by volume aqueous glycol solution enables provision of this feature at minimized cost thereby further enhancing the potential commercial success and acceptability of the invention.

Although ethylene and propylene glycol have long been recognized as effective anti-freeze compositions, particularly in connection with automobile engine cooling systems, their utilization as a snow accumulation preventative by application to and treatment of an outdoor surface has never been successfully commercially demonstrated. The present invention is aimed at an approach which offers a highly simplified glycol formulation which, due to its simplicity, can be made available at minimal cost. However, the important feature of the present invention resides in the fact that, in spite of its great simplicity and concurrent low cost, there is provided a formulation which is not only adequately effective to prevent ice and snow accumulation, but which is also neat and unproblematic in its application and use since it avoids any messy residue or soilage. The essence of the invention is the discovery that when ethylene or propylene glycol is mixed with water within the critical limits set forth herein, together with a dyestuff, the combination of features set forth above will be realized.

The contribution of the present invention will be further appreciated by consideration of the fact that although many different types of glycol formulations have been suggested in the prior art, these compositions are characterized by the inclusion of numerous additives which, while providing added features related to the performance and operability of a compound, increase the cost and complexity thereof. This added cost and complexity may enhance the effectiveness of a particular glycol solution for certain specialized applications, but it also detracts from its successful marketability as a common snow accumulation preventative.

As a result of the simplicity and inexpensiveness of the present invention, the formulation in which it is embodied may be purchased by a homeowner or shopkeeper and applied to a sidewalk or driveway at an attractive cost which will not become prohibitive as a result of the large surface which must be covered or treated. In the performance of the method of the present invention, the formulation may be applied to an outdoor surface which is substantially clear of accumulation in any one of a number of appropriate manners, preferably by the simple expedient of spraying or pouring directly upon the surface from the receptacle such as, for example, an ordinary garden watering can. The surface upon which the formulation is applied will comprise ordinary outdoor pavement consisting of concrete, asphalt or the like.

The limits of 30 to 45 percent by volume of glycol in water are considered critical for several reasons. Since the primary purpose of the invention is effective accumulation prevention at minimal cost, it has been found that the use of ethylene or propylene glycol is conducive to minimizing cost while maintaining effectiveness. Although ethylene and propylene glycol are the preferred glycols for use in the present invention, other alkylene glycols and/or polyalkylene glycols such as, e.g., polyethylene glycol or polypropylene glycol could be utilized with effectiveness. However, it should be understood that in view of the type of use which is intended, requiring minimal cost, the utilization of such other glycols must involve a selection which will not operate to detract from the commercial acceptability of the invention by unduly increasing the cost thereof.

In accordance with the present invention, it was found that beyond the critical limits of 30 to 45 percent by volume of the glycol, the effectiveness of the formulation to prevent accumulation diminishes as the percentage of glycol concentration is established above or below the critical range. Increasing the glycol concentration above 45 percent by volume was found to reduce the effectiveness of the formulation for accumulation prevention, and it should be avoided since it unnecessarily increases the cost of the formulation due to the increased cost of the added glycol. Diminishing the concentration to below 30 percent by volume was found to adversely affect the performance of the formulation when applied to a treated surface in that the ability to prevent accumulation was diminished.

The mechanism whereby the critical glycol volume limitations of the present invention are established, to the extent that it is presently understood, is believed to relate to the freezing point characteristics imparted by the formulation to the treated surface and to the commensurate effect imparted to impinging ice or snow. In the operation of the formulation of the invention, it is believed that the freezing point of ice or snow impinging the treated surface is lowered thereby causing it to melt at temperatures ordinarily encountered in populated areas. Increasing the glycol concentration above the 45 percent by volume, or decreasing it below 30 percent by volume, tends to create a higher freezing point for impinging ice or snow then would be created by a formulation within these limits thereby reducing the effectiveness of the formulation. It should be understood that the foregoing explanation is provided in an attempt to facilitate understanding of the invention and as a probable basis for the establishment of the critical limits set forth. It should not, however, be interpreted in a limiting sense or as defining the scope and purview of the invention.

The preferred specific embodiment of the present invention is a formulation of approximately 37 percent by volume ethylene or propylene glycol, or mixtures thereof, in water with approximately one-tenth of one percent by volume of fuchsin added. This formulation was found to be effective up to approximately 6 inches of snowfall to prevent accumulation. With the formulation applied directly upon a surface to be treated, either by pouring or otherwise spraying or soaking the surface to be treated, a covering of the preventative formulation upon such surface will impart thereto a coloration or hue as a result of the dyestuff which has been added to the formulation of the invention. This coloration will be visible to a user allowing him to observe the presence of the preventative formulation upon the treated surface. As snow commences to fall, impingement thereof upon the treated surface will cause the snow to melt and flow away. This flow will tend to wash away with it the formulation which has been applied to the surface. The continuing snowfall will cause the coloration or hue of the treated surface to disappear. Since, as previously mentioned, a single application of the present invention is effective up to about six inches of snowfall, it will be found that when this level of snowfall is approached the coloration or hue of the treated surface will tend to diminish or disappear. This will permit discernment of the need for a second application of the preventative formulation. Of course, it will be apparent that the need for subsequent reapplications of the formulation in a heavy or continued snowfall will be discernible in the same manner as previously described.

The preferred way of using the formulation is to spray it on the surface to be treated from a pressurized feed tank. Generally, pressures on the order of about 15 lbs./in.$^2$ are used to overcome the pressure drop of a fine spray, conical output spray nozzle. A single nozzle at the end of a flexible hose will allow the operator to control the area which is being covered. The area to be covered is sprayed until it is visibly wetted. Ordinarily, one gallon of the formulation is sufficient to coat about 100 square feet of surface. The following examples illustrate the invention:

Sealed concrete blocks, each having an area of about one square foot were cooled in a chamber to 20°F. After cooling, 0.01 gallon of a mixture composed of 37 percent by volume ethylene glycol, 67 percent by volume water, and 0.1 percent by weight of the dyes listed in the Table, was sprayed uniformly on the blocks, a different dye being applied to each block.

After spraying, 100 ml. increments of freshly fallen snow conditioned to 20°F were sprinkled onto each block and allowed to melt at 20°F. Each solution was then evaluated for time of complete melting of each 100 ml. of snow and the number of ml increments of snow applied before melting ceased. If sufficient color remained from visual observation, additional increments were applied until minimal color remained or no further melting was observed.

All color evaluations were performed by a single observer and were purely visual in order to simulate actual use conditions of the composition. That is to say, since a user of the product, e. g., a homeowner would obviously not have any type of quantitative equipment available, it would be necessary for such user to visually observe and determine whether or not sufficient color remained on the surface to require reapplication.

TABLE

| DYE | | COLOR INDEX | TIME REQUIRED TO MELT SNOW | | | RESIDUAL STAIN |
| --- | --- | --- | --- | --- | --- | --- |
| | | | FIRST TIME | SECOND TIME | THIRD TIME | |
| Group 1 | | | | | | |
| Acid Yellow | 1 | 10316 | 20' | 40' | 60' | none |
| Acid Green | 25 | 61550 | 20' | 40' | 60' | slight |
| Acid Green | 1 | 10020 | 20' | 40' | 60' | very slight |
| Acid Red | 97 | 20890 | 20' | 40' | 60' | very slight |
| Acid Orange | 7 | 15510 | 20' | 40' | 60' | slight |
| Acid Blue | 25 | 62055 | 20' | 40' | 60' | slight |
| Acid Blue | 78 | 62105 | 20' | 40' | 60' | slight |
| Acid Blue | 92 | 13390 | 20' | 40' | 60' | slight |
| Bromaminic Acid | | --- | 20' | 40' | 60' | none |
| Group 2 | | | | | | |
| Basic Violet | 2 | 42520 | 20' | 40' | 60' | slight |
| Basic Violet | 1 | 42535 | 20' | 40' | 60' | severe |
| Basic Violet | 4 | 42600 | 20' | 40' | 60' | severe |
| Basic Blue | 26 | 44045 | 20' | 40' | 60' | heavy |
| Basic Blue | 7 | 42595 | 20' | 40' | 60' | severe |
| Basic Green | 4 | 42000 | 20' | 40' | 60' | moderate |

As can be seen from the results in the Table, those dyes in Group 1, consistently disappeared in a uniform manner and proportionately with the loss of resistance to freezing. Thus, under this group of dyes, which all contained sulfonic acid groups, when the dye color essentially disappeared, it was clear that a reapplication of the composition is required.

In contrast, with the dyes of Group 2, not only was consistency with respect to staining between the dyes not obtained, but also, all but one left relatively heavy stains or color on the block, even though all of the resistance to freezing had disappeared.

Although the present invention has been described by reference to specific embodiments thereof, it should be understood that variations and modifications within the knowledge of those skilled in the art are possible without departing from the spirit and scope of the invention.

What is claimed is:

1. A method for treating walkways, roadways and driveways to prevent the accumulation of ice and snow thereupon, said method comprising applying to said surface a liquid composition consisting essentially of 30 to 45 percent by volume of at least one alkylene glycol having from 2 to 6 carbon atoms in water, and an organic dye compatible therewith selected from the group consisting of aromatic sulfonic acids, nitro-sulfonic acids, mono-azo sulfonic acids, diazosulfonic acids, and anthraquinone sulfonic acids, in an amount sufficient to impart to said formulation a visible coloration when said formulation is in contact with the surface and such that said coloration disappears in a uniform manner and proportionately with the loss of resistance to prevent such accumulation.

2. The method of claim 1, wherein the quantity of said dye is about one-tenth of one percent by volume of said composition.

3. The method of claim 1, wherein the dye is selected from the group consisting of acid yellow 1, bromaminic acid, acid green 1, acid orange 7, acid blue 92, acid red 97, acid blue 78, acid blue 25, and acid green 25.

4. The method of claim 1, wherein said alkylene glycol is selected from the group consisting of ethylene glycol, propylene glycol and mixtures thereof.

5. The method of claim 1, wherein said composition is applied to said outdoor surface by pressurized spraying directly upon said surface while said surface is substantially clear of any ice and snow accumulation.

* * * * *